US005932054A

United States Patent [19]

Shinozaki et al.

[11] Patent Number: 5,932,054
[45] Date of Patent: *Aug. 3, 1999

[54] RADIO WAVE ABSORBER COMPOSITION, RADIO WAVE ABSORBER MEMBER, RADIO WAVE ABSORBER, AND METHOD FOR PRODUCING RADIO WAVE ABSORBER MEMBER

[75] Inventors: Yukuo Shinozaki, Kashiwa; Mamoru Shinozaki, Funabashi, both of Japan

[73] Assignee: Takenaka Corporation, Osaka-shi, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/493,812

[22] Filed: Jun. 22, 1995

[30] Foreign Application Priority Data

| | | | |
|---|---|---|---|
| Jun. 23, 1994 | [JP] | Japan | 6-141914 |
| Jun. 23, 1994 | [JP] | Japan | 6-141915 |
| Jun. 2, 1995 | [JP] | Japan | 7-136693 |

[51] Int. Cl.[6] .......... B29B 1/65

[52] U.S. Cl. .......... 156/242; 156/307.1; 264/681

[58] Field of Search .......... 264/681; 156/89, 156/196, 242, 246, 297, 305, 307.1

[56] References Cited

U.S. PATENT DOCUMENTS

| | | | |
|---|---|---|---|
| 4,939,024 | 7/1990 | Oosawa et al. . | |
| 5,312,678 | 5/1994 | McCullough, Jr. et al. | 428/225 |

FOREIGN PATENT DOCUMENTS

| | | |
|---|---|---|
| 0 370 421 | 5/1990 | European Pat. Off. . |
| 0 383 142 | 8/1990 | European Pat. Off. . |
| 3267437 | 2/1992 | Japan . |
| 5291782 | 2/1994 | Japan . |
| WO 92/16033 | 7/1992 | WIPO . |

*Primary Examiner*—Timothy M. Speer
*Attorney, Agent, or Firm*—Blackwell Sanders Peper Martin

[57] ABSTRACT

This invention relates to a composition for preparing a nonflammable, light-weight radio wave absorber which has a capacity of absorbing radio waves at low frequency bands of 30 MHz to 1,000 MHz or at high frequency bands of over 1,000 MHz, a radio wave absorber member using the above composition, a radio wave absorber using the radio wave absorber member, and a method for producing the above wave absorber member.

The radio wave absorber composition for a low frequency band of 30 MHz to 1,000 MHz mainly consists of cement, light-weight aggregates, non-conductive fibers and synthetic resin emulsion. And, the wave absorber composition for a high frequency band of over 1,000 MHz mainly consists of cement, light-weight aggregates, carbon fibers and/or carbon graphite and synthetic resin emulsion.

8 Claims, 11 Drawing Sheets

RADIO WAVE ABSORBER COMPOSITION, RADIO WAVE ABSORBER MEMBER, RADIO WAVE ABSORBER, AND METHOD FOR PRODUCING RADIO WAVE ABSORBER MEMBER

FIELD OF THE INVENTION

This invention relates to a composition for preparing a nonflammable, light-weight radio wave absorber which has a capacity of absorbing radio waves at low frequency bands of 30 MHz to 1,000 MHz or at high frequency bands of over 1,000 MHz, a radio wave absorber member using the above composition, a radio wave absorber, and a method for producing the above radio wave absorber member.

BACKGROUND OF THE INVENTION

In these years, the number of radio frequency interferences caused by information equipment is sharply increasing at home and overseas with the progress of advanced information.

There are many such cases including that police and government office radiocommunication frequencies are interrupted, and TV radio frequencies are interrupted by personal computers.

To coincide with the progress of electronic equipment whose operation is easily malfunctioned or made abnormal due to such electromagnetic wave interferences, the control of electromagnetic waves (EMI) is a worldwide issue.

The control is made by FCC (Federal Communication Commission) in the U.S.A. and by FTZ (Fernmelde Technisches Zentralant) which is the technical organization of the Ministry of Posts and Telecommunications in Germany.

Internationally, IEC (International Electrotechnical Commission) and its subordinate organization, CISPR (Comite International Special des Perturbations Radio Electriques), control the limited values and measuring methods of electromagnetic wave interferences caused by various electrical appliances and the standards of measuring equipment, and give recommendations to the member nations.

The control of electromagnetic wave interferences in Japan is voluntarily in effect by VCCI (Voluntary Control Council for Interference by data processing equipment and electronic office machines) since 1986.

In the electromagnetic wave (EMI) radiation test of electronic equipment, the measurement frequency is specified to be 30 MHz to 1,000 MHz according to each standard of CISPR (Comite International Special des Perturbations Radio Electriques), FCC (Federal Communication Commission), and VDE.

Consequently, a radio wave absorber is used to absorb incident radiowave energy and to convert into heat energy.

Since a minimum frequency of 30 MHz has a very long wavelength of 10 m, it is difficult to obtain a high absorbing property at a low frequency band of 100 MHz or below.

For example, a carbon-impregnated urethan absorber is required to have a length of 5 m or more to obtain the absorption of 20 dB or more at a frequency band of 30 MHz or higher.

Thus, when the urethan absorber is used to dispose a radio shielding room, the wave absorber is often insufficient in absorbing capacity to provide the radio shielding room with a sufficient low-frequency characteristic.

In these years, an excellent ferrite wave absorber is being used, and its performance and miniaturization have been improved steeply, enabling to conform to ANSI C63.4 using the ferrite wave absorber alone.

For the ferrite wave absorber, a ferrite tile of 10 cm×10 cm is generally used. It has a disadvantage that the absorbing capacity at a low-frequency band of 100 MHz or below is degraded because of small gaps formed between the ferrite tiles when they are tiled.

In the case of a pyramid type wave absorber in combination with ferrite, a large pyramid type wave absorber having a height of 0.9 m to 2.7 m is required to ensure the wave absorbing capacity at a low frequency band of 30 MHz to 100 MHz, and particularly at 100 MHz or below.

Therefore, the large pyramid type wave absorber is required to be made of light-weight materials, and in most cases has heretofore used a support material such as urethane foam (sponge-like), expanded polystyrene or rubber, which is impregnated or mixed with carbon graphite. And, it is generally used in the form of a plate, a mountain or a pyramid to provide for a wide frequency band.

A plate type wave absorber (FIG. 10) has a flat face into which a radiowave enters, and is generally used as a single layer wave absorber. It is to be understood that a two-layer wave absorber or multi-layer wave absorber using two layers or more is basically designed in the form of a plate.

In FIG. 10, reference numeral 31 stands for a single-layer or multi-layer plate type wave absorbing material, 32 for a ferrite tile disposed on the back face of the wave absorber 31, and 33 for a metallic reflector disposed on the back face of the ferrite tile 32.

An angle type wave absorber (FIG. 11) has its front face made in the form of triangle mountains made of the wave absorbing material. This form has advantages that making an angle front face linearly increases gradually a wave attenuation constant on that face, so that a wide-band characteristic can be obtained.

In FIG. 11, reference 41 stands for a hollow angle type wave absorbing material, 42 for a ferrite tile disposed on the back face of the wave absorber 41, and 43 for a metallic reflector disposed on the back face of the ferrite tile 42.

A pyramid type wave absorber (FIG. 12) scatters an incident wave in various directions. Therefore, it is difficult to know in which direction the reflected wave is directed. Most of the imported wave absorbers are pyramid type wave absorbers.

In FIG. 12, reference 51 stands for a hollow pyramid type wave absorbing material made of urethane foam, 52 for a ferrite tile disposed on the back face of the wave absorber 51, and 53 for a metallic reflector disposed on the back face of the ferrite tile 52.

However, the above materials have a disadvantage that they are very flammable.

Therefore, nonflammable materials have been eagerly demanded, and they are now more eagerly demanded with the increasing needs for them.

In the U.S.A., a restriction has been imposed on incombustibility, and products having a flame retarder mixed into the above urethane material have been announced but still have various disadvantages. Thus, satisfactory products have not been produced yet.

Nonflammable materials have been produced with antimony chloride or the like mixed as a flame retarder, but have disadvantages that they are deteriorated soon, deformed and inferior in durability.

On the other hand, wave absorbers using a cement-based material such as a gas concrete or calcium silicate plate as a nonflammable material have been tried, but not commercialized because they are too heavy to be used and hard to produce as the wave absorbers (e.g., Japanese Patent Application Laid-open Prints No. 62-42498, No. 64-44097, No. 2-27798, No. 4-294599, etc.).

A wave absorber which is produced with carbon graphite impregnated has disadvantages that the impregnated graphite content is varied, its production is not controled easily, and this wave absorber is hardly made uniform in quality (e.g., Japanese Patent Application Laid-open Print No. 62-45100).

SUMMARY OF THE INVENTION

An object of this invention is to provide a nonflammable ultra-light radio wave absorber having a capacity of absorbing radio waves at low frequency bands of 30 MHz to 1,000 MHz in place of conventional radio wave absorbers made of urethane foam, plastics or the like.

Another object of this invention is to provide a nonflammable radio wave absorber, which can be applied to a high frequency range exceeding 1,000 MHz, in place of conventional radio wave absorbers made of urethane foam, plastics or the like.

A further object of this invention is to provide a radio wave absorber composition which can be poured into a mold to make into radio wave absorbers having various shapes, and a method for producing a radio wave absorber member using the above composition.

Still a further object of this invention is to provide a radio wave absorber composition which can be formed into various thicknesses ranging from a film to a thick board, and a method for producing a radio wave absorber member using the above composition.

Another object of this invention is to provide a nonflammable radio wave absorber and radio wave absorber member.

Another object of this invention is to provide an ultra-light radio wave absorber and radio wave absorber member which can be handled easily.

Another object of this invention is to provide a radio wave absorber which is stronger as compared with conventional organic matter-based radio wave absorbers.

Another object of this invention is to provide a radio wave absorber and radio wave absorber member having remarkable durability.

Another object of this invention is to provide a radio wave absorber and radio wave absorber member which can be cut off with a cutter or saw and fabricated into various shapes.

Another object of this invention is to provide a radio wave absorber and radio wave absorber member which can be easily attached to walls and ceilings and nailed.

Another object of this invention is to provide a radio wave absorber and radio wave absorber member which can be troweled or sprayed by a wet process.

Another object of this invention is to provide a radio wave absorber composition which can freely adjust a radio wave absorber required for a high frequency band exceeding 1,000 MHz depending on a blending ratio of carbon graphite and carbon fiber, and a method for producing a radio wave absorber member using the above composition.

In view of the above, this invention configures a radio wave absorber composition of this invention for producing the nonflammable ultra-light radio wave absorber having a capacity of absorbing radio waves at low frequency bands of 30 MHz to 1,000 MHz with cement, light-weight aggregates, non-conductive fibers and synthetic resin emulsion.

This radio wave absorber composition comprises cement, light-weight aggregates, non-conductive fibers, synthetic resin emulsion, organic microballoons and carbon graphite.

This radio wave absorber composition comprises cement, light-weight aggregates, non-conductive fibers, synthetic resin emulsion, organic microballoons and carbon fibers.

This radio wave absorber composition comprises cement, light-weight aggregates, non-conductive fibers, synthetic resin emulsion, organic microballoons, carbon graphite and carbon fibers.

This radio wave absorber composition comprises 1–20 parts by weight of light-weight aggregates, 1–20 parts by weight of synthetic resin emulsion (on a solid content basis), 1–5 parts by weight of non-conductive fibers, 1–10 parts by weight of organic microballoons and 0.1–5 parts by weight of carbon fibers against 100 parts by weight of cement.

This radio wave absorber composition comprises 1–20 parts by weight of light-weight aggregates, 1–20 parts by weight of synthetic resin emulsion (on a solid content basis), 1–5 parts by weight of non-conductive fibers, 1–10 parts by weight of organic microballoons and 5–20 parts by weight of carbon graphite against 100 parts by weight of cement.

This radio wave absorber composition comprises 1–20 parts by weight of light-weight aggregates, 1–20 parts by weight of synthetic resin emulsion (on a solid content basis), 1–5 parts by weight of non-conductive fibers, 1–10 parts by weight of organic microballoons, 5–20 parts by weight of carbon graphite and 0.01–5 parts by weight of carbon fibers to 100 parts by weight of cement.

A radio wave absorber member using the above wave absorber composition comprises the above wave absorber composition.

This wave absorber member has the wave absorber composition in a thickness of 3 to 10 mm.

A radio wave absorber member using the above wave absorber composition comprises the above wave absorber composition and a nonflammable light-weight thin plate prepared by laminating the above wave absorber composition.

This wave absorber member has the wave absorber composition in a thickness of 3 to 10 mm.

A radio wave absorber using the above wave absorber member is produced by assembling the wave absorber member into a quadrangular pyramid, and to its bottom face, a ferrite tile-adhered plate and a metal reflector are attached.

The method for producing a radio wave absorber member of this invention to prepare a nonflammable ultra-light radio wave absorber having a capacity of absorbing waves at low frequency bands of 30 MHz to 1,000 MHz kneads fine particles, which are prepared by mixing 1–20 parts by weight of light-weight aggregates with 100 parts by weight of cement, and a material, which is prepared by previously kneading 1–5 parts by weight of non-conductive fibers, 1–10 parts by weight of organic microballoons and 0.01–5 parts by weight of carbon fibers with 4–100 parts by weight of synthetic resin emulsion (a solid content of 22.5%), with water, and forms into a prescribed shape.

This method for producing a radio wave absorber member kneads fine particles, which are prepared by mixing 1–20 parts by weight of light-weight aggregates with 100 parts by weight of cement, and a material, which is prepared by previously kneading 1–5 parts by weight of non-conductive fibers, 1–10 parts by weight of organic microballoons and 5–20 parts by weight of carbon graphite with 4–100 parts by weight of synthetic resin emulsion (a solid content of 22.5%), with water, and forms into a prescribed shape.

This method for producing a radio wave absorber member kneads fine particles, which are prepared by mixing 1–20 parts by weight of light-weight aggregates with 100 parts by weight of cement, and a material, which is prepared by previously kneading 1–5 parts by weight of non-conductive fibers, 1–10 parts by weight of organic microballoons, 5–20 parts by weight of carbon graphite and 0.01–5 parts by weight of carbon fibers with 4–100 parts by weight of synthetic resin emulsion (a solid content of 22.5%), with water, and forms into a prescribed shape.

This method for producing a radio wave absorber member kneads fine particles, which are prepared by mixing 1–20 parts by weight of light-weight aggregates with 100 parts by weight of cement, and a material, which is prepared by previously kneading 1–5 parts by weight of non-conductive fibers, 1–10 parts by weight of organic microballoons, and 0.01–5 parts by weight of carbon fibers with 4–100 parts by weight of synthetic resin emulsion (a solid content of 22.5%), with water, and laminates on a nonflammable light-weight thin plate.

This method for producing a radio wave absorber member kneads fine particles, which are prepared by mixing 1–20 parts by weight of light-weight aggregates with 100 parts by weight of cement, and a material, which is prepared by previously kneading 1–5 parts by weight of non-conductive fibers, 1–10 parts by weight of organic microballoons, and 5–20 parts by weight of carbon graphite with 4–100 parts by weight of synthetic resin emulsion (a solid content of 22.5%), with water, and laminates on a nonflammable light-weight thin plate.

This method for producing a radio wave absorber member kneads fine particles, which are prepared by mixing 1–20 parts by weight of light-weight aggregates with 100 parts by weight of cement, and a material, which is prepared by previously kneading 1–5 parts by weight of non-conductive fibers, 1–10 parts by weight of organic microballoons, 5–20 parts by weight of carbon graphite and 0.01–5 parts by weight of carbon fibers with 4–100 parts by weight of synthetic resin emulsion (a solid content of 22.5%), with water, and laminates on a nonflammable light-weight thin plate.

On the other hand, the radio wave absorber composition according to this invention which can be freely prepared into a radio wave absorber for high frequency bands exceeding 1,000 MHz comprises cement, light-weight aggregates, synthetic resin emulsion, organic microballoons, and carbon graphite.

This wave absorber composition comprises cement, light-weight aggregates, synthetic resin emulsion, organic microballoons, and carbon fibers.

This wave absorber composition comprises cement, light-weight aggregates, synthetic resin emulsion, organic microballoons, carbon graphite, and carbon fibers.

This wave absorber composition comprises 1–20 parts by weight of light-weight aggregates, 1–20 parts by weight of synthetic resin emulsion (on a solid content basis), 1–10 parts by weight of organic microballoons, and 0.5–5 parts by weight of carbon fibers against 100 parts by weight of cement.

This wave absorber composition comprises 1–20 parts by weight of light-weight aggregates, 1–20 parts by weight of synthetic resin emulsion (on a solid content basis), 1–10 parts by weight of organic microballoons, and 5–20 parts by weight of carbon graphite against 100 parts by weight of cement.

This wave absorber composition comprises 1–20 parts by weight of light-weight aggregates, 1–20 parts by weight of synthetic resin emulsion (on a solid content basis), 1–10 parts by weight of organic microballoons, 5–20 parts by weight of carbon graphite, and 0.5–5 parts by weight of carbon fibers against 100 parts by weight of cement.

The method for producing a radio wave absorber member of this invention to prepare a nonflammable ultra-light radio wave absorber having a capacity of absorbing waves at high frequency bands exceeding 1,000 MHz kneads fine particles, which are prepared by mixing 1–20 parts by weight of light-weight aggregates with 100 parts by weight of cement, and a material, which is prepared by previously kneading 1–10 parts by weight of organic microballoons and 0.5–5 parts by weight of carbon fibers with 4–100 parts by weight of synthetic resin emulsion (a solid content of 22.5%), with water, and forms into a prescribed shape.

This method for producing a radio wave absorber member kneads fine particles, which are prepared by mixing 1–20 parts by weight of light-weight aggregates with 100 parts by weight of cement, and a material, which is prepared by previously kneading 1–10 parts by weight of organic microballoons and 5–20 parts by weight of carbon graphite with 4–100 parts by weight of synthetic resin emulsion (a solid content of 22.5%), with water, and forms into a prescribed shape.

This method for producing a radio wave absorber member kneads fine particles, which are prepared by mixing 1–20 parts by weight of light-weight aggregates with 100 parts by weight of cement, and a material, which is prepared by previously kneading 1–10 parts by weight of organic microballoons, 5–20 parts by weight of carbon graphite and 0.5–5 parts by weight of carbon fibers with 4–100 parts by weight of synthetic resin emulsion (a solid content of 22.5%), with water, and forms into a prescribed shape.

In this invention, the cement includes normal Portland cement, high early strength Portland cement, ultra high-early-strength Portland cement and super ultra high-early-strength Portland cement.

This invention has the following reasons of using the cement. (1) a nonflammable hardened body (radio wave absorber) can be obtained. (2) it is the only one inexpensive nonflammable matrix material. (3) it can be freely formed into any shapes.

Examples of the light-weight aggregates include inorganic microballoons and organic microballoons.

The inorganic microballoons have a particle diameter of, for example, 5–200 $\mu$m and a specific gravity of about 0.3–0.7, and include, for example, ceramics balloons and mineral balloons mainly consisting of silicon and aluminum, and include aluminum silicate balloons, alumina silicate balloons, glass microballoons, and shirasu balloons in classificational expression.

The inorganic microballoons are used together with organic microballoons for weight reduction.

The organic microballoons have, for example, a particle diameter of 10–100 $\mu$ m and a specific gravity of 0.04 or below, and include vinylidene chloride and vinyl chloride.

The organic microballoons excel in ultra-lightweight properties, and the inorganic microballoons in fire resistance.

As the organic microballoons are increased in amount, fire resistance is degraded, while the increase of the amount of the inorganic microballoons makes a desired weight heavier.

In view of the above, the blending ratio of the organic and inorganic microballoons is determined as follows.

Specifically, 1–20 parts by weight of light-weight aggregates (the inorganic microballoons) and 1–10 parts by weight of the organic microballoons are used against 100 parts by weight of cement.

A well-balanced blending of the organic microballoons and the inorganic microballoons enables to produce an ultra-lightweight nonflammable radio wave absorber.

When the blending ratio of the organic and inorganic microballoons exceeds the upper limit, the material itself becomes brittle and, when it lowers to below the lower limit, a desired lightweight material cannot be obtained.

Examples of the synthetic resin emulsion includes those of acrylic based, vinyl acetate based, synthetic rubber based, vinylidene chloride based, vinyl chloride based or mixtures thereof. They are, for example, styrene-modified vinyl acetate copolymer, acrylic styrene copolymer and styrene-butadiene-rubber.

Most of the pyramid type wave absorbers used have a height of 0.9–2.7 m when a capacity of absorbing waves at low frequency bands of 30 MHz to 1,000 MHz is required. A 1.8 m high pyramid type radio wave absorber is desired as a guide to be about 10 Kg in weight in view of the following points, and nonflammable: (1) workability for attaching, and (2) safety to prevent from dropping after attaching.

Conventional wave absorbers made of carbon graphite-impregnated urethane foam have a weight of about 20–25 Kg.

To reduce the above weight to 10 Kg or below, a pyramid type wave absorber is produced using the lightweight (specific gravity $\gamma \approx 0.3$ to 0.4) wave absorber composition of this invention, then it has a thickness of about 10 mm.

Weight reduction and strength have opposite properties. When the weight is reduced, the strength is lowered.

The wave absorber composition of this invention mixes reinforcing fibers therein to supplement a decrease in strength due to the weight reduction.

As the reinforcing fibers, since carbon fibers are conductive, its ratio of quantity has a direct effect on the wave absorbing capacity.

Consequently, its quantity to be added is limited as a matter of course.

To supplement the lowering of the material strength due to a shortage of the carbon fibers as a reinforcing material, non-conductive fibers are added.

The non-conductive fibers are determined to be added in 1–5 parts by weight to 100 parts by weight of cement.

These non-conductive fibers include vinylon fiber, nylon fiber, polypropylene fiber, acrylonitrile fiber, aramid fiber, glass fiber, cellulose, asbestos and rock fiber.

The carbon graphite is fine carbon particles having a particle diameter of about 15–38 μm. These fine carbon particles include, for example, Ketjen Black EC (trademark) manufactured by Ketjen Black International (vendor: Mitsubishi Chemical Industries Limited), which have a unique hollow shell particle structure and excel in conductivity by 3–4 times as compared with ordinary fine carbon particles.

These fine carbon particles have a fine particle diameter of about 15–38 μm and, when they are used alone and kneaded with cement-based matrix, chances of contact and approach of individual fine carbon particles are decreased. Therefore, the single use of the fine carbon particles is not preferable in view of conductivity because the conductivity is lowered.

Therefore, this invention adds conductive fine fibers (carbon fiber) to make up the disadvantage due to the single use of the fine carbon particles.

The carbon fiber used has, for example, a fiber length of about 6 mm and a fiber diameter of about 7–18 μm.

The conductive carbon fibers are dispersed into the cement-based matrix in which the fine carbon particles are dispersed, to enhance the conductivity of the cement-based matrix. In other words, there are obtained effects by intertwining of the fibers and by connecting of the fine carbon particles by virtue of the conductive fine fibers. And, the conductive fine fibers reinforce the strengths (in bending, tensile and others) of a cement mortar hardened body. And, cracks due to drying shrinkage which is fatal to the cement mortar (cement hydrate) can be prevented form occurring by dispersing a drying shrinkage stress using the conductive fine fibers.

Since the carbon fibers have a fiber length of, for example, about 6 mm, their mixing into the composition is naturally limited. Therefore, it is sometimes difficult to adjust a required resistance value using the carbon fibers alone.

Therefore, this invention supplements a shortage of the carbon fiber with carbon graphite.

A thickener is a water-soluble polymer compound. Examples of the water-soluble polymer compound include methyl cellulose, polyvinyl alcohol and hydroxyethyl cellulose.

In the production method according to this invention, after kneading the wave absorber composition, eg., it is formed by pouring into a mold or spraying on a formwork, otherwise plates having a prescribed thickness is previously made and assembled for reinforcement to produce the pyramid type wave absorber. In this case, a press molding is conducted, or steam curing or autoclave curing is conducted as required.

And the wet material on site can be troweled or charged in addition to the spraying using a machine.

In this case, the carbon graphite and the carbon fibers are premixed with the synthetic resin emulsion to uniformly disperse them.

The dispersion of the carbon graphite and the carbon fibers in the cement-based matrix by ordinary kneading is quite difficult because the fine particles are connected. Therefore, a special mixer such as an omnimixer is used to disperse the fibers.

When the synthetic resin emulsion, the carbon graphite and the carbon fibers are premixed, however, the carbon graphite and the carbon fibers can be dispersed quite satisfactorily by means of an ordinary mortar mixer when cement and light-weight aggregates are kneaded, and a matrix-reinforcing effect can be enhanced.

This is because the adoption of the synthetic resin emulsion having the properties similar to those of a surface-active agent improves the intermingling of these materials electrochemically.

It is also because that the coexistence of the carbon fibers and the carbon graphite within the synthetic resin emulsion helps disperse them physically by virtue of their synergism.

And, as a method for producing a radio wave absorber member of this invention to prepare a nonflammable ultra-light radio wave absorber which has a capacity of absorbing waves at low frequency bands of 30 MHz to 1,000 MHz, a radio wave absorber composition which is prepared by kneading may be produced into a composite plate with another plate by, for example, applying the above composition in a thickness of about 3 to 5 mm onto a nonflammable light-weight sheet whose periphery is surrounded by a frame.

In this case, since the plate to be formed also serves as the bottom plate for a formwork it can be easily removed from the frame, being advantageous in view of the structure.

Examples of the nonflammable light-weight sheet include a nonflammable board having a thickness of 5 to 10 mm, and the wave absorber composition has a thickness of about 1 to 5 mm.

To form the wave absorber composition in the formwork, it is aged to cure, and transferred, but it can be transferred without aging when it is applied to a nonflammable light-weight sheet.

Besides, its strength is remarkably increased by compositing with the nonflammable light-weight sheet. For example, when a 3-mm thick radio wave absorber composition is laminated onto a 7-mm thick nonflammable light-weight sheet, the resulting composite board has a specific gravity of 0.42 and a bending strength of 26.6 $Kgf/cm^2$.

When the above composite board is used to produce a pyramid type radio wave absorber, the wave absorber composition is desired to be about 3 to 5 mm thick because the absorber is required to have a thickness of about 10 mm. Consequently, carbon fibers are preferably contained in a large ratio in the wave absorber composition.

And, in a high frequency band exceeding 1,000 MHz which is within the scope of this invention, the absorbers can be produced in the form of a solid pyramid without particularly limiting their thickness and their height can be made lower than 45 cm.

DETAILED DESCRIPTION OF THE PREFERRED EMBODIMENT

Figure 1:
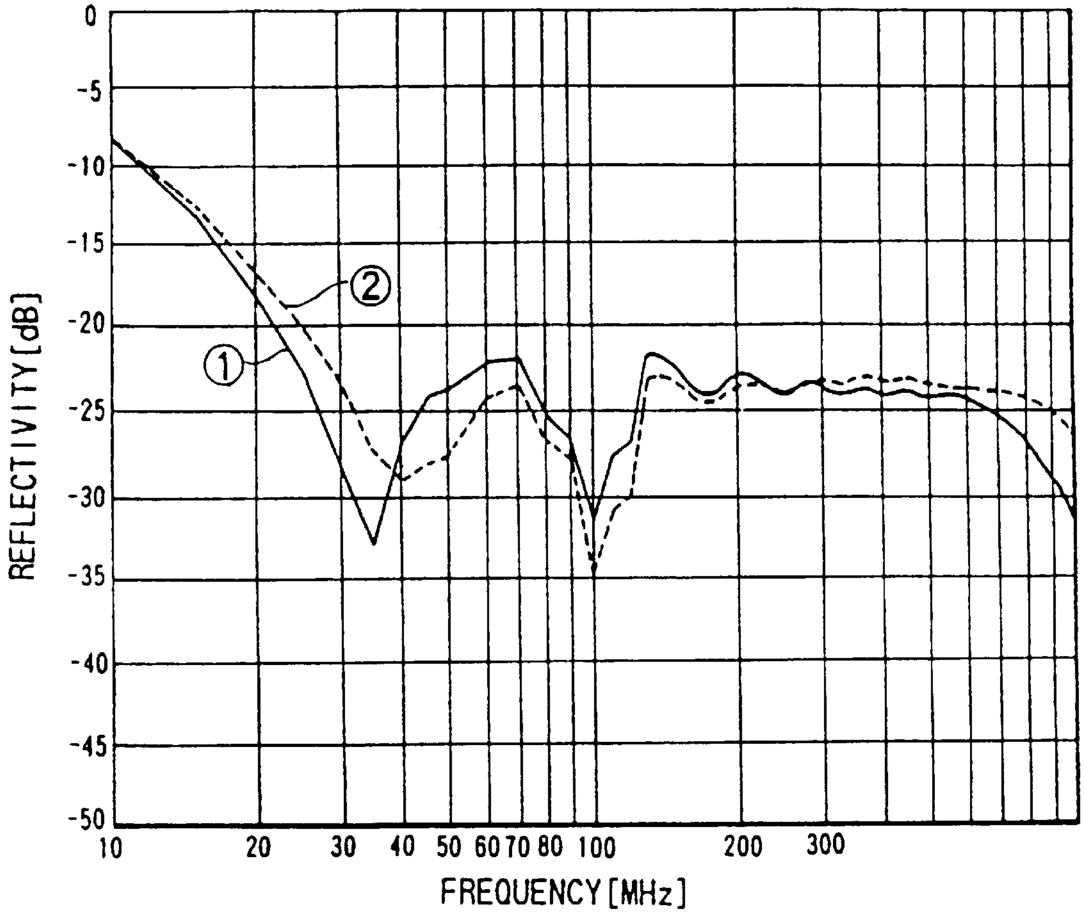
FIG. 1 is a graph showing the radio wave absorption characteristics of hollow pyramid type wave absorbers using the compositions of Examples 1 and 2.

Examples 1 to 9 relate to a composition for preparing a nonflammable, light-weight radio wave absorber which has a capacity of absorbing radio waves at low frequency bands of 30 MHz to 1,000 MHz, a radio wave absorber member using the above composition, a radio wave absorber, and a method for producing the above wave absorber member.

Examples 10 to 12 relate to a composition for preparing a nonflammable, light-weight radio wave absorber which has a capacity of absorbing radio waves at high frequency bands exceeding 1,000 MHz, a radio wave absorber member using the above composition, a radio wave absorber, and a method for producing the above wave absorber member.

EXAMPLE 1

With 44.9 parts by weight (a solid content of 10.1 parts by weight) of ethylene-vinyl acetate emulsion (synthetic resin emulsion)(a solid content of 22.5%), 2.48 parts by weight of vinylon fibers, 0.27 part by weight of carbon fibers having a fiber length of about 6 mm, 5.35 parts by weight of organic microballoons having a particle diameter of 5–100 μm, a very small quantity of a thickener, an antifoamer and an antiseptic agent, and 150 parts by weight of city water were kneaded in advance. Then, 100 parts by weight of high early strength Portland cement and 11.8 parts by weight of inorganic microballoons (light-weight aggregates) having a particle diameter of 5–200 μm were further added and kneaded. The obtained substance was filled in a formwork to form a plate type radio wave absorber member.

The physical properties of the obtained plate type wave absorber member are shown in Table 1.

EXAMPLE 2

With 44.9 parts by weight (a solid content of 10.1 parts by weight) of ethylene-vinyl acetate emulsion (synthetic resin emulsion)(a solid content of 22.5%), 2.48 parts by weight of vinylon fibers, 0.18 part by weight of carbon fibers having a fiber length of about 6 mm, 5.35 parts by weight of organic microballoons having a particle diameter of 5–100 μm, a very small quantity of a thickener, an antifoamer and an antiseptic agent, and 150 parts by weight of city water were kneaded in advance. Then, 100 parts by weight of high early strength Portland cement and 11.8 parts by weight of inorganic microballoons (light-weight aggregates) having a particle diameter of 5–200 μm were further added and kneaded. The obtained substance was filled in a formwork to form a plate type radio wave absorber member.

The physical properties of the obtained plate type wave absorber member are shown in Table 1.

EXAMPLE 3

With 44.9 parts by weight (a solid content of 10.1 parts by weight) of ethylene-vinyl acetate emulsion (synthetic resin emulsion)(a solid content of 22.5%), 2.48 parts by weight of vinylon fibers, 0.092 part by weight of carbon fibers having a fiber length of about 6 mm, 5.35 parts by weight of organic microballoons having a particle diameter of 5–100 μm, 4.21 parts by weight of carbon graphite of about 30 μm, a very small quantity of a thickener, an antifoamer and an antiseptic agent, and 150 parts by weight of city water were kneaded in advance. Then, 100 parts by weight of high early strength Portland cement and 11.8 parts by weight of inorganic microballoons (light-weight aggregates) having a particle diameter of 5–200 μm were further added and kneaded. The obtained substance was filled in a formwork to form a plate type radio wave absorber member.

The physical properties of the obtained plate type wave absorber member are shown in Table 1.

EXAMPLE 4

With 44.9 parts by weight (a solid content of 10.1 parts by weight) of ethylene-vinyl acetate emulsion (synthetic resin emulsion)(a solid content of 22.5%), 2.48 parts by weight of vinylon fibers, 0.18 part by weight of carbon fibers having a fiber length of about 6 mm, 5.35 parts by weight of organic microballoons having a particle diameter of 5–100 μm, 4.21 parts by weight of carbon graphite of about 30 μm, a very small quantity of a thickener, an antifoamer and an antiseptic agent, and 150 parts by weight of city water were kneaded in advance. Then, 100 parts by weight of high early strength Portland cement and 11.8 parts by weight of inorganic microballoons (light-weight aggregates) having a particle diameter of 5–200 μm were further added and kneaded. The obtained substance was filled in a formwork to form a plate type radio wave absorber member.

The physical properties of the obtained plate type wave absorber member are shown in Table 1.

EXAMPLE 5

With 44.9 parts by weight (a solid content of 10.1 parts by weight) of ethylene-vinyl acetate emulsion (synthetic resin emulsion)(a solid content of 22.5%), 2.48 parts by weight of vinylon fibers, 0.092 part by weight of carbon fibers having a fiber length of about 6 mm, 5.35 parts by weight of organic microballoons having a particle diameter of 5–100 μm, 8.42 parts by weight of carbon graphite of about 30 μm, a very small quantity of a thickener, an antifoamer and an antiseptic agent, and 150 parts by weight of city water were kneaded in advance. Then, 100 parts by weight of high early strength Portland cement and 11.8 parts by weight of inorganic microballoons (light-weight aggregates) having a particle diameter of 5–200 μm were further added and kneaded. The obtained substance was filled in a formwork to form a plate type radio wave absorber member.

The physical properties of the obtained plate type wave absorber member are shown in Table 1.

EXAMPLE 6

With 44.9 parts by weight (a solid content of 10.1 parts by weight) of ethylene-vinyl acetate emulsion (synthetic resin emulsion)(a solid content of 22.5%), 2.48 parts by weight of vinylon fibers, 1.39 parts by weight of carbon fibers having a fiber length of about 6 mm, 5.35 parts by weight of organic microballoons having a particle diameter of 5–100 μm, a very small quantity of a thickener, an antifoamer and an antiseptic agent, and 150 parts by weight of city water were kneaded in advance. Then, 100 parts by weight of high early strength Portland cement and 11.8 parts by weight of inorganic microballoons (light-weight aggregates) having a particle diameter of 5–200 μm were further added and kneaded. The obtained substance was filled in a formwork to form a plate type radio wave absorber member.

The physical properties of the obtained plate type wave absorber member are shown in Table 1.

EXAMPLE 7

With 44.9 parts by weight (a solid content of 10.1 parts by weight) of ethylene-vinyl acetate emulsion (synthetic resin emulsion)(a solid content of 22.5%), 2.48 parts by weight of vinylon fibers, 0.92 part by weight of carbon fibers having a fiber length of about 6 mm, 5.35 parts by weight of organic microballoons having a particle diameter of 5–100 μm, a very small quantity of a thickener, an antifoamer and an antiseptic agent, and 150 parts by weight of city water were kneaded in advance. Then, 100 parts by weight of high early strength Portland cement and 11.8 parts by weight of inorganic microballoons (light-weight aggregates) having a particle diameter of 5–200 μm were further added and kneaded. The obtained substance was filled in a formwork to form a plate type radio wave absorber member.

The physical properties of the obtained plate type wave absorber member are shown in Table 1.

TABLE 1

| | Air-dried specific gravity | Bending strength ($Kgf/cm^2$) | Compression strength ($Kgf/cm^2$) |
|---|---|---|---|
| Example 1 | 0.33 | 16.0 | 16.8 |
| Example 2 | 0.34 | 15.2 | 17.8 |
| Example 3 | 0.36 | 10.8 | 15.2 |
| Example 4 | 0.34 | 12.2 | 15.8 |
| Example 5 | 0.35 | 10.1 | 15.3 |
| Example 6 | 0.32 | 16.8 | 15.2 |
| Example 7 | 0.33 | 16.3 | 15.4 |

(4 - week strength)

EXAMPLE 8

Figure 2:
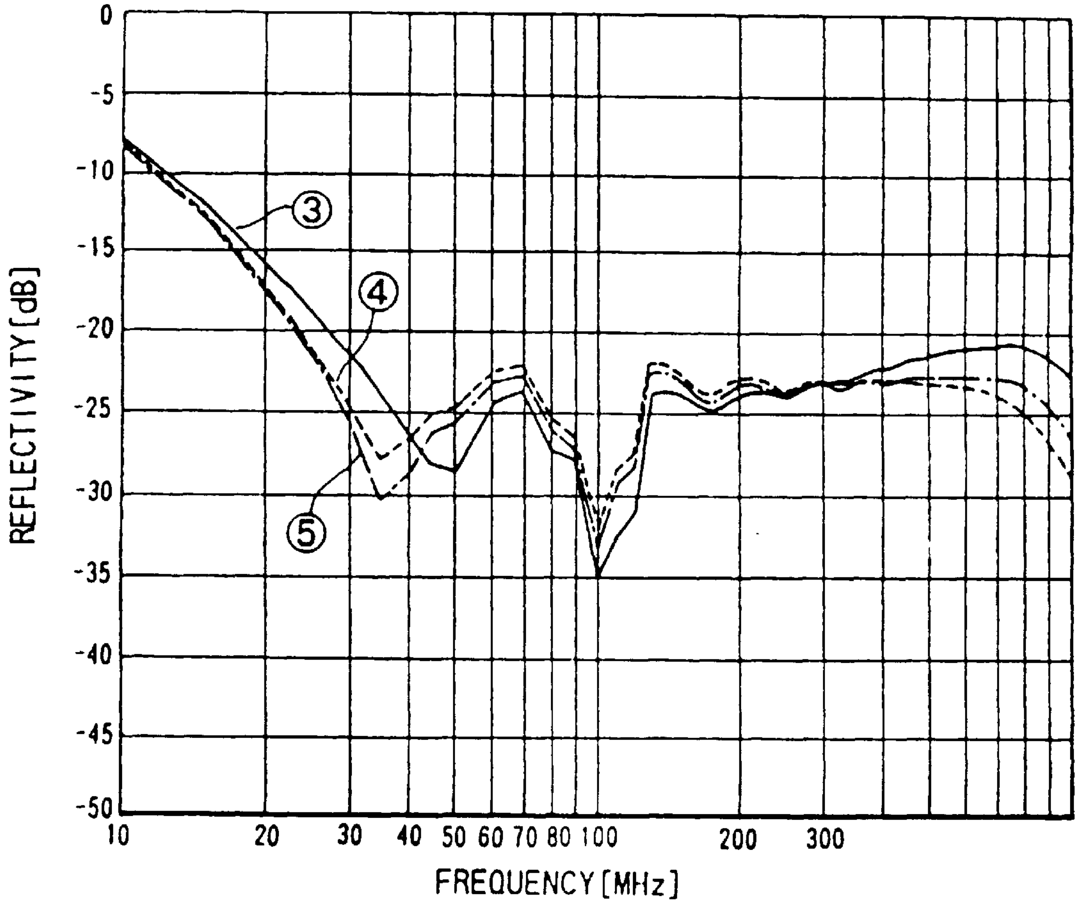
FIG. 2 is a graph showing the radio wave absorption characteristics of hollow pyramid type wave absorbers using the compositions of Examples 3 to 5.
Figure 3:
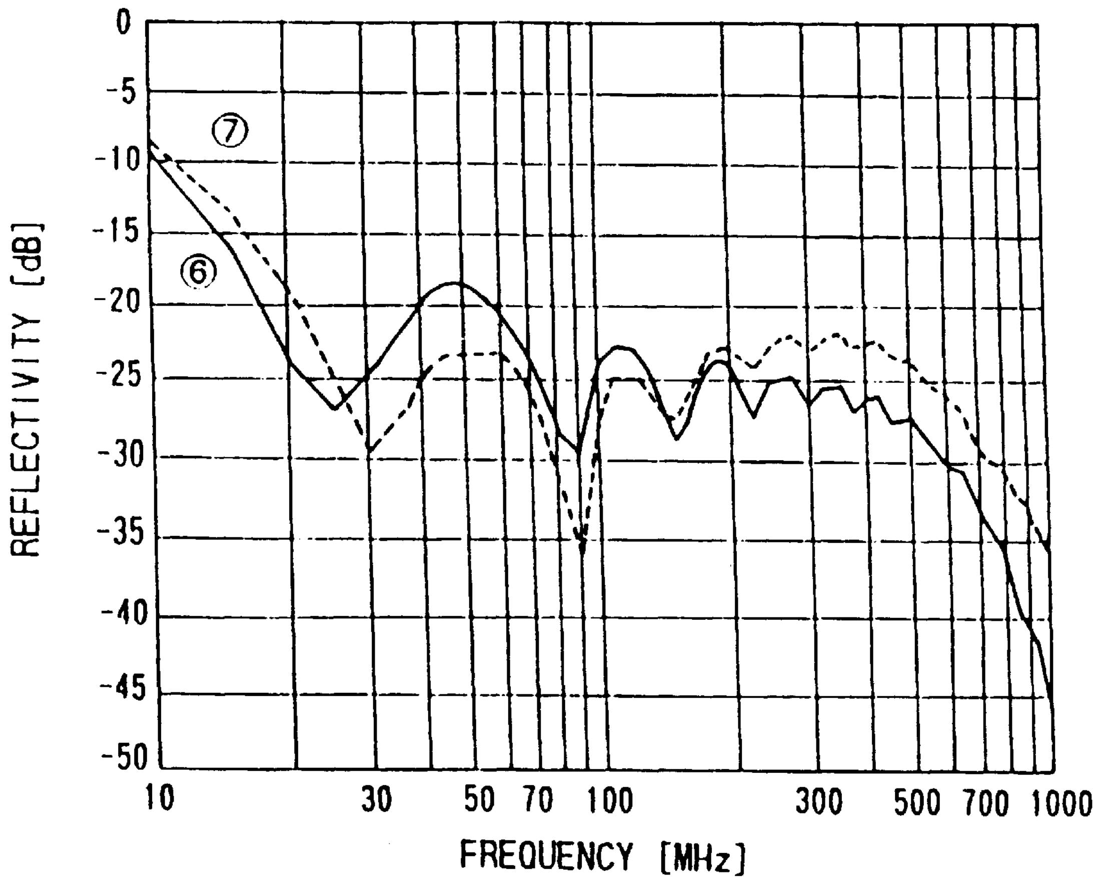
FIG. 3 is a graph showing the radio wave absorption characteristics of hollow pyramid type wave absorbers using the compositions of Examples 6 and 7.

FIG. 1 to FIG. 3 show the performance test results obtained by simulating the radio wave absorbers prepared using the wave absorber members produced in Examples 1 to 7.

Figure 4:
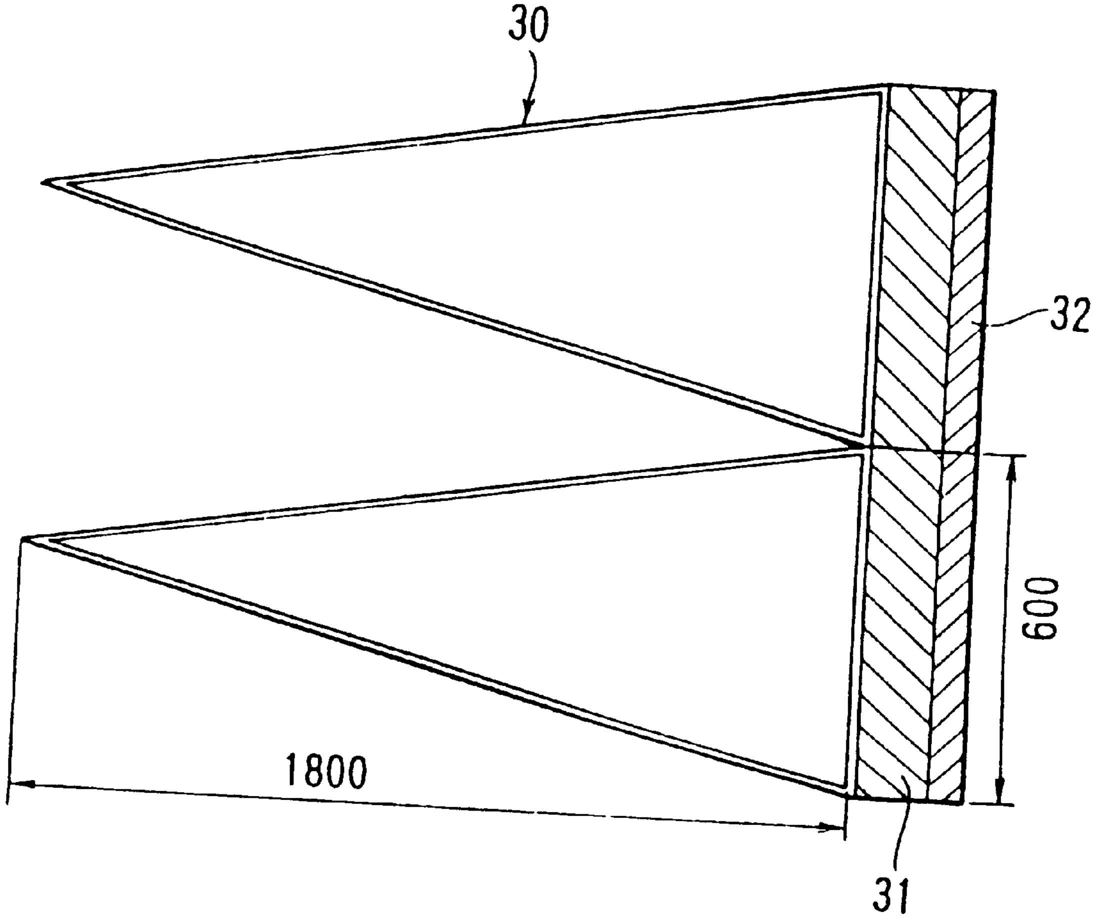
FIG. 4 is a perspective view showing a pyramid type radio wave absorber.

The results show reflectivities (absorption factors) obtained by performing a simulation assuming the structure of the 1,800 mm ferrite composite absorber shown in FIG. 4, based on the complex dielectric constant value determined by a coaxial pipe measuring method (S parameter method).

In this case, the 1,800 mm ferrite composite absorber consists of a hollow pyramid type absorber 10 having a height of 1,800 mm, a thickness of 10 mm and a bottom area of 60 cm×60 cm, a plate 11 to which a ferrite tile of 10 cm×10 cm and having a thickness of 6.3 mm is adhered, and a metallic reflector 12 having a thickness of 0.015 cm.

Figure 5:
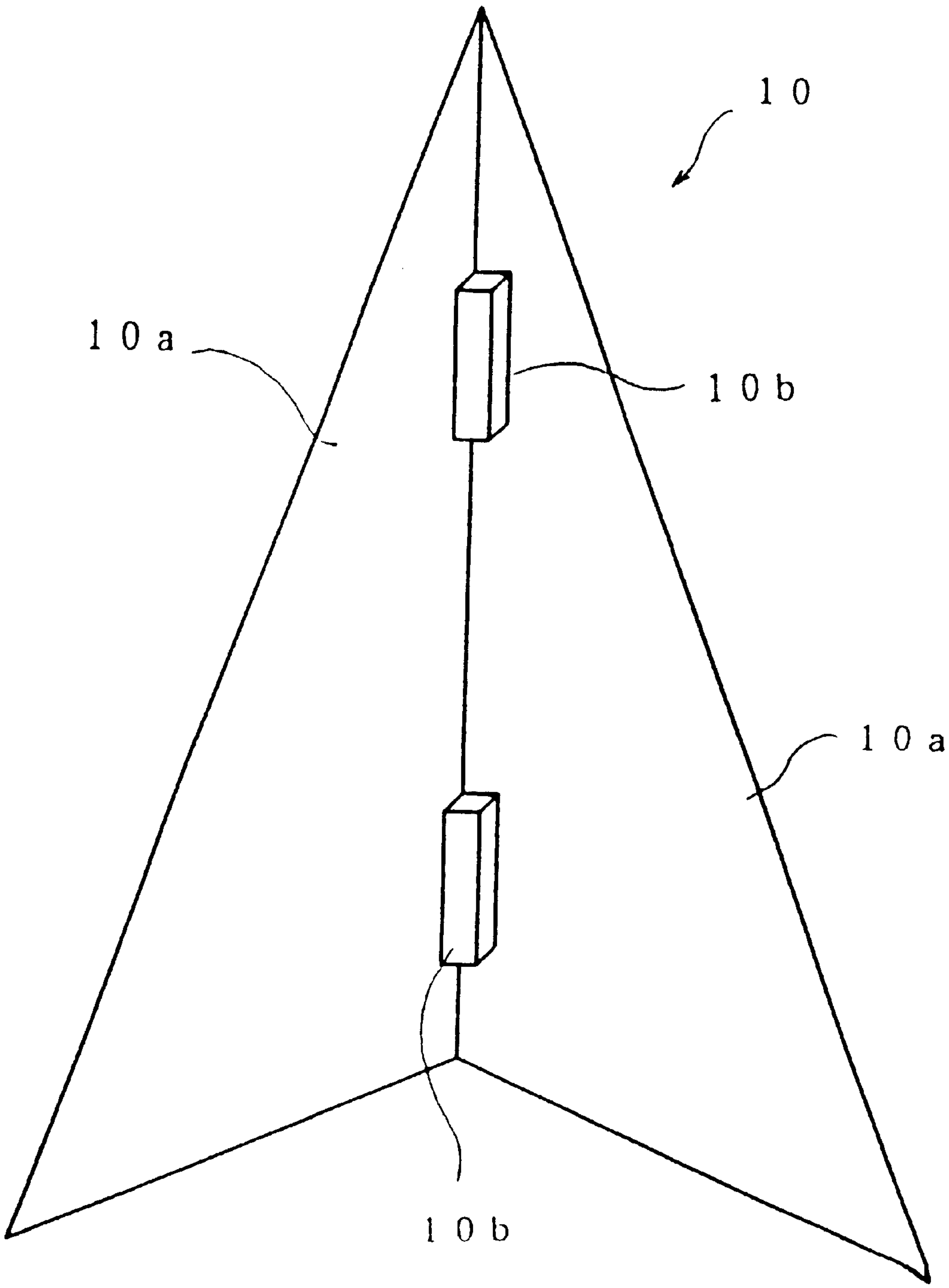
FIG. 5 is an explanatory view showing the inside of an assembled example of the pyramid type radio wave absorber of FIG. 4.
Figure 6:
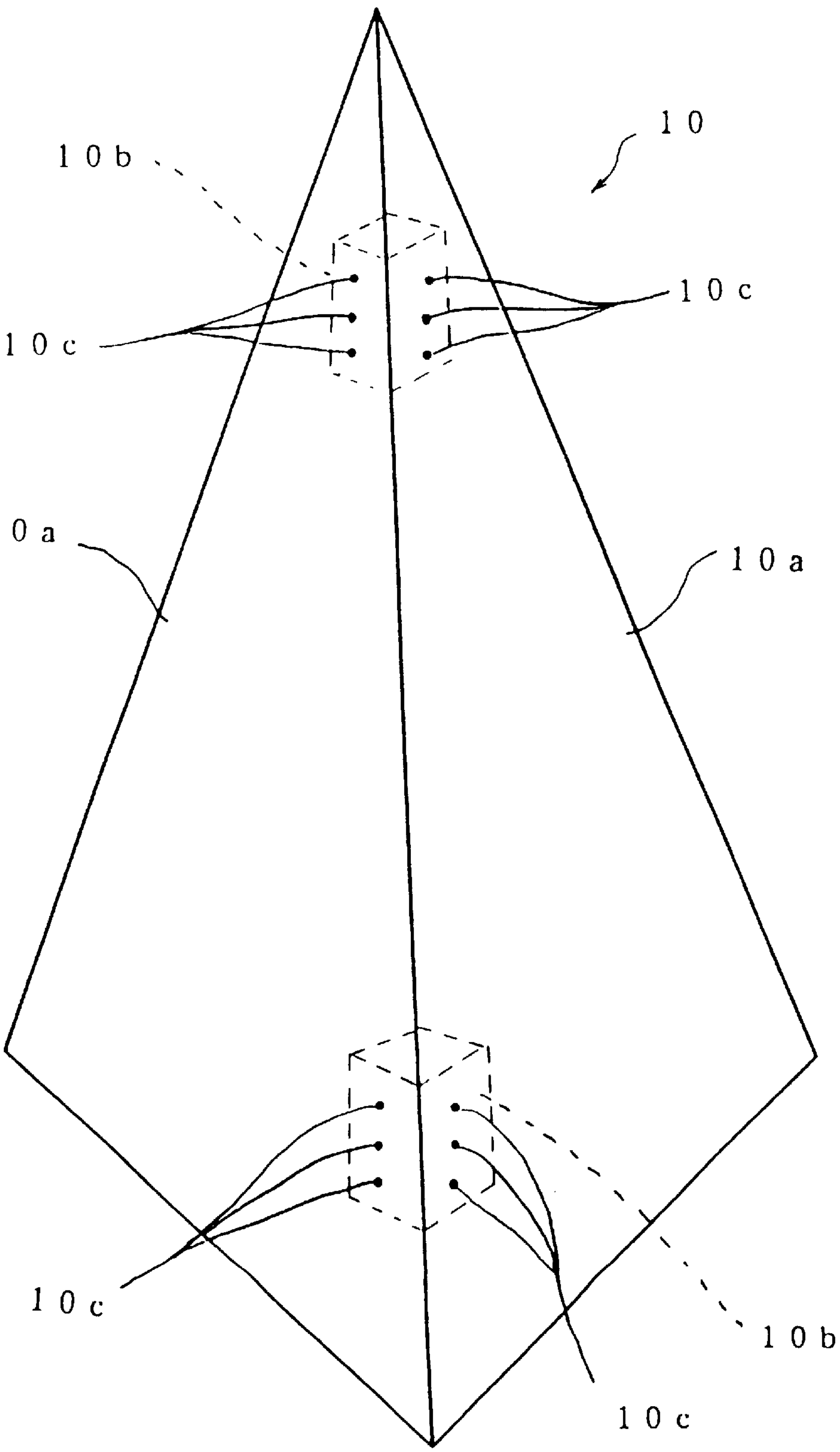
FIG. 6 is an explanatory view showing the outside of an assembled example of the pyramid type radio wave absorber of FIG. 4.

This hollow pyramid type absorber 10 is assembled by, for example, joining the oblique sides of four triangle plates 10*a,* and fixing battens 10*b* to the inside corners of the joint oblique sides with plastic screws or plastic nails 10*c,* which do not effect on the wave absorbing capacity, from outside the plates as shown in FIG. 5 and FIG. 6.

The four triangle plates 10*a* can also be assembled by bonding together with an adhesive agent.

In FIG. 1, ① shows the values obtained using the plate type wave absorber member of Example 1, and ② shows the values obtained using the plate type weave absorber member of Example 2.

The values of ① and ② show that the absorption factors sharply increase toward frequencies from 10 MHz to 30 MHz, and that the absorption factors are 90% or more at a frequency range from 30 MHz to 1,000 MHz.

When observed in further detail, the values of ① with the carbon fibers added in a large quantity are superior to the values of ② with the carbon fibers added in a small quantity at a frequency range from 10 MHz to 40 MHz, but this feature is reversed at a frequency range from 40 MHz to 300

MHz. And it is seen that when a frequency is 300 MHz or higher, the values of ① with the carbon fibers added in a large quantity are superior to the values of ② with the carbon fibers added in a small quantity.

In FIG. 2, ③ shows the values obtained using the plate type wave absorber member of Example 3, ④ the values obtained using the plate type wave absorber member of Example 4, and ⑤ the values obtained using the plate type wave absorber member of Example 5.

The values of ③ to ⑤ show that the absorption factors sharply increase toward frequencies from 10 MHz to 30 MHz, and that the absorption factors are 90% or more at a frequency range from 30 MHz to 1,000 MHz.

When observed in further detail, the values of ④ with the carbon fibers added in a large quantity are superior to the values of ③ with the carbon fibers added in a small quantity at a frequency range from 10 MHz to 40 MHz, but this feature is reversed at a frequency range from 40 MHz to 300 MHz. And, it is seen that when a frequency is 300 MHz or higher, the values of ④ with the carbon fibers added in a large quantity are superior to the values of ③ with the carbon fibers added in a small quantity.

On the other hand, the values of ⑤ with the same carbon fiber content as in the case of the values of ③ but the carbon graphite content higher than in the values of ③ show the similar feature to the values of ④.

In FIG. 3, ⑥ shows the values obtained using the plate type wave absorber member of Example 6, and ⑦ the values obtained using the plate type wave absorber member of Example 7.

The values of ⑥ and ⑦ show that the absorption factor sharply increases toward frequencies from 10 MHz to 30 MHz, and that the absorption factor is 90% or more at a frequency range of from 30 MHz to 1,000 MHz.

When observed in further detail, in the values of ⑥ and ⑦, the values of ⑥ with the carbon fibers added in a large quantity are superior to the values of ⑦ with the carbon fibers added in a small quantity at a frequency range from 10 MHz to 25 MHz, but this feature is reversed at a frequency range from 25 MHz to 150 MHz. And it is seen that when a frequency is 150 MHz or higher, the values of ⑥ with the carbon fibers added in a large quantity are superior to the values of ⑦ with the carbon fibers added in a small quantity.

The set conditions for the simulation are as shown in the drawings.

The relation between the reflectivity and the absorption factor is as shown below:

$$Y=20 \log_{10} X$$

where, Y stands for reflectivity (dB) and X for reflectivity (×1000%).

And the reflectivity is represented by (1−X)×100%.

Since these values can be changed as desired by changing the mixing ratio, a radio wave absorber for a required frequency band can be produced.

Besides, since the wave absorber composition of this invention can be formed into various shapes by pouring into a formwork, radio wave absorbers for required frequency bands can be produced by variously changing the shapes into angle and pyramid types in addition to the plate type.

Furthermore, as indicated by the simulation results, a radio wave absorber for a required absorption range can be also produced by incorporating ferrite and a metallic plate.

EXAMPLE 9

With 44.9 parts by weight (a solid content of 10.1 parts by weight) of ethylene-vinyl acetate emulsion (synthetic resin emulsion)(a solid content of 22.5%), 2.48 parts by weight of vinylon fibers, 1.84 parts by weight of carbon fibers having a fiber length of about 6 mm, 5.35 parts by weight of organic microballoons having a particle diameter of 5–100 μm, a very small quantity of a thickener, an antifoamer and an antiseptic agent, and 150 parts by weight of city water were kneaded in advance. Then, 100 parts by weight of high early strength Portland cement and 11.8 parts by weight of inorganic microballoons (light-weight aggregates) having a particle diameter of 5–200 μm were further added and kneaded. The obtained substance was filled in a formwork whose periphery was closed by a nonflammable light-weight sheet having a thickness of 7 mm to form a radio wave absorber member as a composite plate.

The wave absorber members were produced in four thicknesses of 3 mm, 4 mm, 5 mm and 6 mm.

Figure 7:
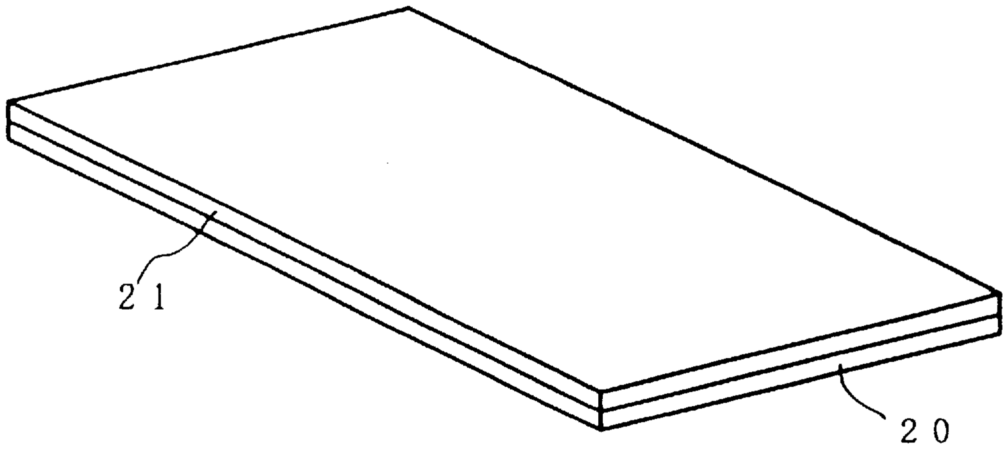
FIG. 7 is a perspective view showing the radio wave absorber member of Example 9.

These wave absorber members have a radio wave absorber composition 21 laminated onto a nonflammable light-weight sheet 20 as shown in FIG. 7.

Figure 8:
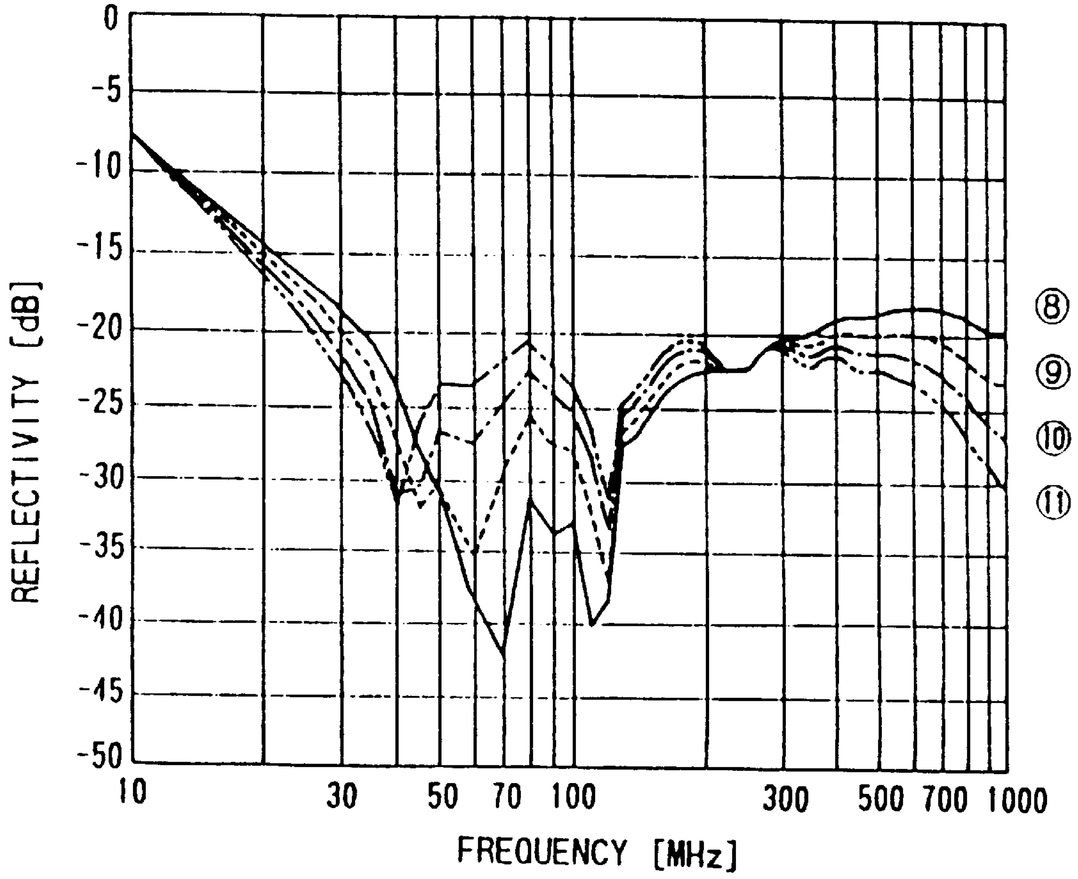
FIG. 8 is a graph showing the radio wave absorption characteristics of a hollow pyramid type wave absorber using the composition of Example 9.

FIG. 8 shows the performance test results obtained by simulating the wave absorbers prepared using these wave absorber members produced above.

The results show reflectivities (absorption factors) obtained by performing a simulation assuming the structure of the 1,800 mm ferrite composite absorber shown in FIG. 4, based on the complex dielectric constant value determined by a coaxial pipe measuring method (S parameter method).

In this case, the 1,800 mm ferrite composite absorber consists of a hollow pyramid type absorber 10 having a height of 1,800 mm, a thickness of 10 mm to 13 mm and a bottom area of 60 cm×60 cm, a plate 11 to which a ferrite tile of 10 cm×10 cm and having a thickness of 6.3 mm is adhered, and a metallic reflector 12 having a thickness of 0.015 cm.

In FIG. 8, ⑧ shows the values obtained using the plate type wave absorber member having a thickness of 3 mm, ⑨ the values obtained using the plate type wave absorber member having a thickness of 4 mm, ⑩ the values obtained using the plate type wave absorber member having a thickness of 5 mm, and ⑪ the values obtained using the plate type wave absorber member having a thickness of 6 mm.

The values of ⑧ to ⑪ show that the absorption factors sharply increase toward frequencies from 10 MHz to 30 MHz, and that the absorption factors are 90% or more at a frequency range from 30 MHz to 1,000 MHz in the same way as in Example 7.

When observed in further detail, it is seen that the absorption factor is superior in the order from ⑧ of the thin plate to ⑪ of the thick plate at frequencies of 10 MHz to 40 MHz, and ⑧ of the thin plate has the most outstanding absorption factor at frequencies of 40 MHz to 250 MHz, then the absorption factor is superior in the order from ⑧ of the thin plate to ⑪ of the thick plate at frequencies of 300 MHz or higher in the same way as at frequencies of 10 MHz to 40 MHz.

EXAMPLE 10

With 27.2 parts by weight (a solid content of 6.1 parts by weight) of ethylene-vinyl acetate emulsion (synthetic resin emulsion)(a solid content of 22.5%), 0.63 part by weight of carbon fibers having a fiber length of about 6 mm, 1.4 parts by weight of organic microballoons having a particle diameter of 5–100 μm, a very small quantity of a thickener, an antifoamer and an antiseptic agent, and 40 parts by weight of city water were kneaded in advance. Then, 25.3 parts by weight of high early strength Portland cement and 3.0 parts by weight of inorganic microballoons (light-weight aggregates) having a particle diameter of 5–20 μm were further added and kneaded. The obtained substance was filled in a formwork to form a plate type radio wave absorber member.

The physical properties of the obtained plate type wave absorber member are shown in Table 2.

EXAMPLE 11

With 25 parts by weight (a solid content of 5.6 parts by weight) of ethylene-vinyl acetate emulsion (synthetic resin emulsion)(a solid content of 22.5%), 0.5 part by weight of carbon fibers having a fiber length of about 6 mm, 5.35 parts by weight of organic microballoons having a particle diameter of 5–100 μm, 2.0 parts by weight of carbon graphite of about 30 μm, a very small quantity of a thickener, an antifoamer and an antiseptic agent, and 37 parts by weight of city water were kneaded in advance. Then, 31 parts by weight of high early strength Portland cement and 2.7 parts by weight of inorganic microballoons (light-weight aggregates) having a particle diameter of 5–200 μm were further added and kneaded. The obtained substance was filled in a formwork to form a plate type radio wave absorber member.

The physical properties of the obtained plate type wave absorber member are shown in Table 2.

EXAMPLE 12

With 17.3 parts by weight (a solid content of 5.6 parts by weight) of ethylene-vinyl acetate emulsion (synthetic resin emulsion)(a solid content of 22.5%), 0.5 part by weight of carbon fibers having a fiber length of about 6 mm, 1.1 parts by weight of organic microballoons having a particle diameter of 5–100 μm, 1.7 parts by weight of carbon graphite of about 30 μm, a very small quantity of a thickener, an antifoamer and an antiseptic agent, and 41.8 parts by weight of city water were kneaded in advance. Then, 35 parts by weight of high early strength Portland cement and 2.4 parts by weight of inorganic microballoons (light-weight aggregates) having a particle diameter of 5–200 μm were further added and kneaded. The obtained substance was filled in a formwork to form a plate type radio wave absorber member.

The physical properties of the obtained plate type wave absorber member are shown in Table 2.

TABLE 2

| Specimen No. | Specimen size (mm) | Voltage: V (V) | Current: I (mA) | Resistance: R (Ω) | Resistivity: ρ (Ω · m) |
|---|---|---|---|---|---|
| Example 10 | 10 × 39 × 39 | 5 | 3.7 | 1,351.3 | 13.5 |
| | | 10 | 7.7 | 1,298.7 | 13.0 |
| Example 11 | 10 × 39 × 40 | 5 | 1.65 | 3,030.3 | 29.5 |
| | | 10 | 4.7 | 2,127.7 | 20.7 |
| Example 12 | 10 × 40 × 40 | 5 | 1.06 | 4,717 | 47.2 |
| | | 10 | 2.3 | 4,347.8 | 43.5 |

Figure 9:
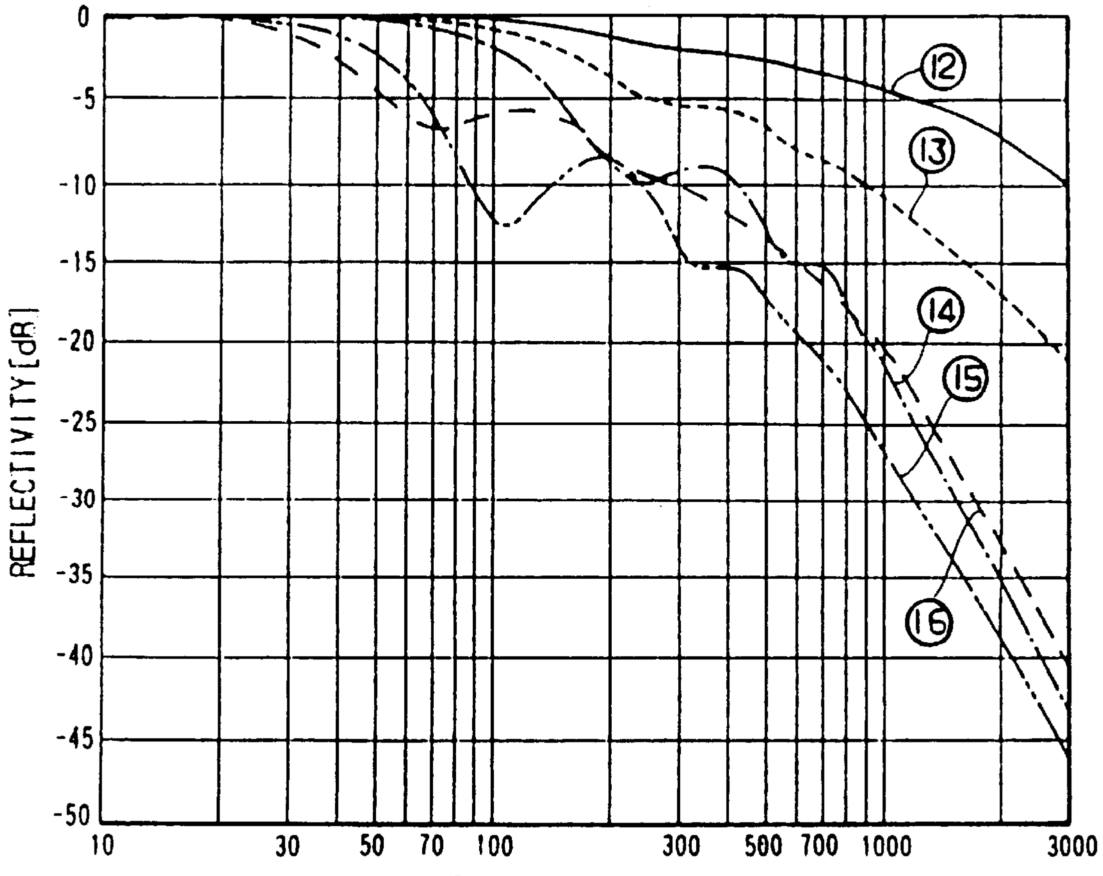
FIG. 9 is a graph showing the radio wave absorption characteristics of a hollow pyramid type radio wave absorber using the composition of Example 10.
Figure 10:
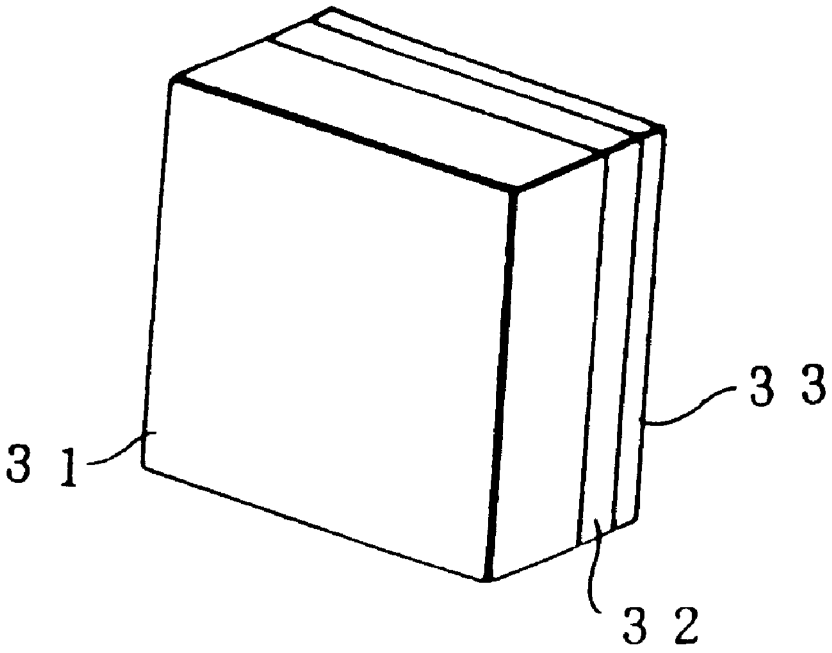
FIG. 10 Prior Art
FIG. 10 is a perspective view showing a plate type radio wave absorber.
Figure 11:
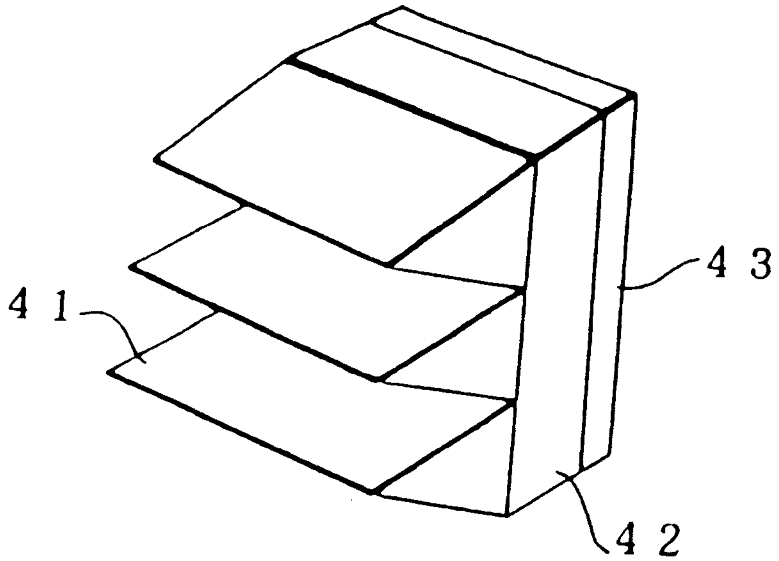
FIG. 11 Prior Art
FIG. 11 is a perspective view showing an angle type radio wave absorber.
Figure 12:
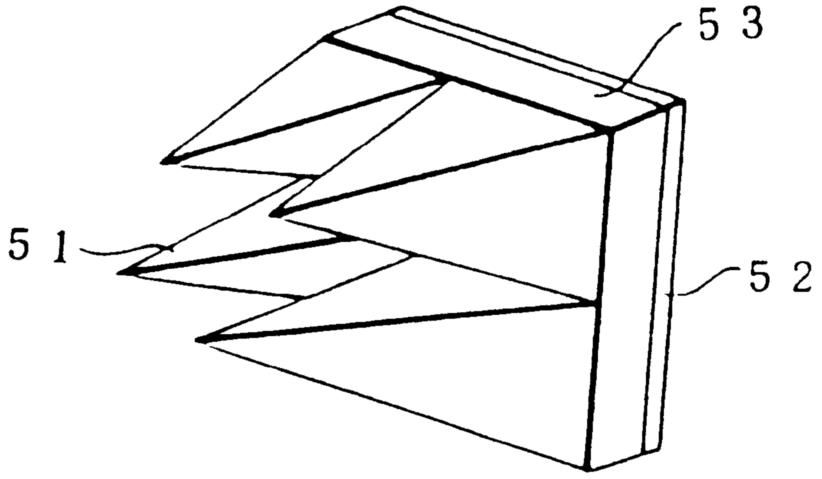
FIG. 12 Prior Art
FIG. 12 is a perspective view showing a pyramid type radio wave absorber.

FIG. 9 shows the performance test results obtained by simulating the wave absorber prepared in Example 10.

Using the material of Example 10, hollow pyramid type absorbers (with a metal reflector provided) having a height of 45 cm and a bottom area of 15 cm×15 cm were assumed. Each pyramid had a plate thickness of ⑫ 0.2 mm, ⑬ 0.5 mm, ⑭ 1.0 mm, ⑮ 5.01 mm, and ⑯ 10.0 mm.

The results show reflectivities (absorption factors) obtained by simulating on the basis of the S parameter results obtained by the measurement according to a coaxial pipe measuring method (S parameter method).

FIG. 9 shows that ⑫ to ⑯ have a smaller reflectivity (dB) and a higher absorption factor when approaching to a higher frequency band.

The relation between the reflectivity and the absorption factor is as shown below:

$$Y=20\log_{10}X$$

where, Y stands for reflectivity (dB) and X for reflectivity (×100%).

And the reflectivity is represented by (1−X)×100%.

Since these values can be changed as desired by changing the mixing ratio, a radio wave absorber for a required frequency band can be produced.

Besides, since the wave absorber composition of this invention can be formed into various shapes by pouring into a formwork, radio wave absorbers for required frequency bands can be produced by variously changing the shapes into angle and pyramid types in addition to the plate type.

Furthermore, as indicated by the simulation results, a radio wave absorber for a required absorption range can be also produced by incorporating ferrite and a metallic plate.

In the above simulation, the hollow pyramid type absorbers have been used for description but, for a high frequency band exceeding 1,000 MHz which is within the scope of this invention, they can be produced in the form of a solid pyramid without particularly limiting their thickness and their height can be made lower than 45 cm.

What is claimed is:

1. A method for producing a radio wave absorber member for preparing a nonflammable, light-weight radio wave absorber having a capacity of absorbing radio waves at low frequency bands of 30 MHZ to 1,000 MHZ, which is characterized by:

kneading fine particles prepared by mixing 1–20 parts by weight of light-weight aggregates with 100 parts by weight of cement, and a material prepared by previously kneading 1–5 parts by weight of non-conductive fibers, 1–10 parts by weight of organic microballoons and 0.1–5 parts by weight of carbon fibers with 4–100 parts by weight of synthetic resin emulsion (a solid content of 22.5%), with water, then forming into a prescribed shape.

2. A method for producing a radio wave absorber member for preparing a nonflammable, light-weight radio wave absorber having a capacity of absorbing radio waves at low frequency bands of 30 MHZ to 1,000 MHZ, which is characterized by:

kneading fine particles prepared by mixing 1–20 parts by weight of light-weight aggregates with 100 parts by weight of cement, and a material prepared by previously kneading 1–5 parts by weight of non-conductive fibers, 1–10 parts by weight of organic microballoons and 5–20 parts by weight of carbon graphite with 4–100 parts by weight of synthetic resin emulsion (a solid content of 22.5%), with water, then forming into a prescribed shape.

3. A method for producing a radio wave absorber member for preparing a nonflammable, light-weight radio wave absorber having a capacity of absorbing radio waves at low frequency bands of 30 MHZ to 1,000 MHZ, which is characterized by:

kneading fine particles prepared by mixing 1–20 parts by weight of light-weight aggregates with 100 parts by weight of cement, and a material prepared by previously kneading 1–5 parts by weight of non-conductive fibers, 1–10 parts by weight of organic microballoons, 5–20 parts by weight of carbon graphite and 0.01–5 parts by weight carbon fibers with 4–100 parts by weight of synthetic resin emulsion (a solid content of 22.5%), with water, then forming into a prescribed shape.

4. A method for producing a radio wave absorber member for preparing a nonflammable, light-weight radio wave absorber having a capacity of absorbing radio waves at low frequency bands of 30 MHZ to 1,000 MHZ, which is characterized by:

kneading fine particles prepared by mixing 1–20 parts by weight of light-weight aggregates with 100 parts by weight of cement, and a material prepared by previously kneading 1–5 parts by weight of non-conductive fibers, 1–10 parts by weight of organic microballoons and 0.01–5 parts by weight of carbon fibers with 4–100 parts by weight of synthetic resin emulsion (a solid content of 22.5%), with water, then laminating on a nonflammable light-weight plate.

5. A method for producing a radio wave absorber member for preparing a nonflammable, light-weight radio wave absorber having a capacity of absorbing radio waves at low frequency bands of 30 MHZ to 1,000 MHZ, which is characterized by:

kneading fine particles prepared by mixing 1–20 parts by weight of light-weight aggregates with 100 parts by weight of cement, and a material prepared by previously kneading 1–5 parts by weight of non-conductive fibers, 1–10 parts by weight of organic microballoons and 5–20 parts by weight of carbon graphite with 4–100 parts by weight of synthetic resin emulsion (a solid content of 22.5%), with water, then laminating on a nonflammable light-weight plate.

6. A method for producing a radio wave absorber member for preparing a nonflammable, light-weight radio wave absorber having a capacity of absorbing radio waves at low frequency bands of 30 MHZ to 1,000 MHZ, which is characterized by:

kneading fine particles prepared by mixing 1–20 parts by weight of light-weight aggregates with 100 parts by weight of cement, and a material prepared by previously kneading 1–5 parts by weight of non-conductive fibers, 1–10 parts by weight of organic microballoons, 5–20 parts by weight of carbon graphite and 0.01–5 parts by weight carbon fibers with 4–100 parts by weight of synthetic resin emulsion (a solid content of 22.5%), with water, then laminating on a nonflammable light-weight plate.

7. A method for producing a radio wave absorber member for preparing a nonflammable ultra-light radio wave absorber having a capacity of absorbing radio waves at high frequency bands exceeding 1,000 MHZ characterized by:

kneading fine particles prepared by mixing 1–20 parts by weight of light-weight aggregates with 100 parts by weight of cement, and a material prepared by previously kneading 0.5–15 parts by weight of carbon fibers and 1–10 parts by weight of organic microballoons with 4–100 parts by weight of synthetic resin emulsion (a solid content of 22.5%), with water, then forming into a prescribed shape.

8. A method for producing a radio wave absorber member according to claim 7, which is characterized by:

kneading fine particles prepared by mixing 1–20 parts by weight of light-weight aggregates with 100 parts by weight of cement, and a material prepared by previously kneading 0.5–15 parts by weight of carbon fibers, 1–10 parts by weight of organic microballoons and 5–20 parts by weight of carbon graphite with 4–100 parts by weight of synthetic resin emulsion (a solid content of 22.5%), with water, then forming into a prescribed shape.

* * * * *

UNITED STATES PATENT AND TRADEMARK OFFICE
CERTIFICATE OF CORRECTION

PATENT NO. : 5,932,054
DATED : August 3, 1999
INVENTOR(S) : SHINOZAKI ET AL.

It is certified that error appears in the above-identified patent and that said Letters Patent are hereby corrected as shown below:

IN THE CLAIMS:

Column 16, line 44, after "cement" insert --with a first prepared material, thereby to provide a mixture--;

line 45, before "material" delete --a--, and insert --the first prepared--, and after "material" insert --having been--;

line 51, after "forming" insert --the mixture--.

line 59, after "cement" insert --with a first prepared material, thereby to provide a mixture--;

line 60, before "material" delete --a--, and insert --the first prepared--, and after "material" insert --having been--;

line 67, after "forming" insert --the mixture--.

Column 17, line 6, after "kneading" insert --the--;

line 8, after "cement" insert --with a first prepared material, thereby to provide a mixture--;

line 9, before "material" delete --a--, and insert --the first prepared--, and after "material" insert --having been--;

line 12, after "weight" insert --of--;

UNITED STATES PATENT AND TRADEMARK OFFICE
CERTIFICATE OF CORRECTION

PATENT NO. : 5,932,054
DATED : August 3, 1999
INVENTOR(S) : SHINOZAKI ET AL.

It is certified that error appears in the above-identified patent and that said Letters Patent are hereby corrected as shown below:

IN THE CLAIMS (Con't.)

Column 17, line 16, after "forming" insert --the mixture--.

line 24, after "cement" insert --with a first prepared material, thereby to provide a mixture--;

line 25, before "material" delete --a--, and insert --the first prepared--, and after "material" insert --having been--;

line 31, after "laminating" insert --the mixture--.

line 39, after "cement" insert --with a first prepared material, thereby to provide a mixture--;

line 40, before "material" delete --a--, and insert --the first prepared--, and after "material" insert --having been--.

Column 18, line 1, after "laminating" insert --the mixture--.

line 9, after "cement" insert --with a first prepared material, thereby to provide a mixture--;

line 10, before "material" delete --a--, and insert --the first prepared--, and after "material" insert --having been--;

line 17, after "laminating" insert --the mixture--.

UNITED STATES PATENT AND TRADEMARK OFFICE
CERTIFICATE OF CORRECTION

PATENT NO. : 5,932,054
DATED : August 3, 1999
INVENTOR(S) : SHINOZAKI ET AL.

It is certified that error appears in the above-identified patent and that said Letters Patent are hereby corrected as shown below:

IN THE CLAIMS (Con't.):

Column 18, line 24, after "cement" insert --with a first prepared material, thereby to provide a mixture--;

line 25, before "material" delete --a--, and insert --the first prepared--, and after "material" insert --having been--;

line 31, after "forming" insert --the mixture--;

line 34, after "kneading" insert --the--;

line 35, after "of" insert --the--;

line 36, after "cement" insert --with a first prepared material, thereby to provide a mixture--;

CERTIFICATE OF CORRECTION

PATENT NO. : 5,932,054
DATED : August 3, 1999
INVENTOR(S) : SHINOZAKI ET AL.

It is certified that error appears in the above-identified patent and that said Letters Patent is hereby corrected as shown below:

line 37, before "material" delete --a--, and insert --the first prepared--, and after "material" insert --having been--;

line 38, after "of" insert --the--;

line 39, before "organic" insert --the--;

Signed and Sealed this

Twenty-second Day of February, 2000

Attest:

Q. TODD DICKINSON

Attesting Officer

*Commissioner of Patents and Trademarks*